(12) United States Patent  
Ascarrunz et al.

(10) Patent No.: US 9,292,853 B2  
(45) Date of Patent: Mar. 22, 2016

(54) AUTOMATED MARKET CART

(71) Applicants: Miguel Angel Ascarrunz, Dallas, OR (US); Anita Giani Ascarrunz, Dallas, OR (US)

(72) Inventors: Miguel Angel Ascarrunz, Dallas, OR (US); Anita Giani Ascarrunz, Dallas, OR (US)

(73) Assignees: Miguel A. Ascarrunz, Dallas, OR (US); Anita G. Ascarrunz, Dallas, OR (US)

( * ) Notice: Subject to any disclaimer, the term of this patent is extended or adjusted under 35 U.S.C. 154(b) by 624 days.

(21) Appl. No.: 13/573,980

(22) Filed: Oct. 18, 2012

(65) Prior Publication Data

US 2013/0226718 A1    Aug. 29, 2013

Related U.S. Application Data

(60) Provisional application No. 61/628,028, filed on Oct. 24, 2011.

(51) Int. Cl.
| | |
|---|---|
| *G06Q 30/00* | (2012.01) |
| *G06Q 20/12* | (2012.01) |
| *G06Q 20/18* | (2012.01) |
| *G06Q 20/20* | (2012.01) |
| *G07G 1/00* | (2006.01) |

(52) U.S. Cl.
CPC ............ *G06Q 30/00* (2013.01); *G06Q 20/12* (2013.01); *G06Q 20/18* (2013.01); *G06Q 20/20* (2013.01); *G06Q 20/204* (2013.01); *G06Q 20/208* (2013.01); *G07G 1/0081* (2013.01)

(58) Field of Classification Search
CPC ....... G06Q 20/12; G06Q 20/18; G06Q 20/20; G06Q 20/204; G06Q 20/208; G06Q 30/00
See application file for complete search history.

(56) References Cited

U.S. PATENT DOCUMENTS

| | | | | |
|---|---|---|---|---|
| 3,836,755 | A * | 9/1974 | Ehrat | 235/383 |
| 4,071,740 | A * | 1/1978 | Gogulski | 235/431 |
| 5,898,158 | A * | 4/1999 | Shimizu et al. | 235/383 |
| 5,992,570 | A * | 11/1999 | Walter | A47F 9/048 186/36 |
| 6,382,357 | B1 * | 5/2002 | Morrison | G06Q 20/343 186/61 |
| 6,587,835 | B1 * | 7/2003 | Treyz | G06Q 20/12 705/14.64 |
| 6,725,206 | B1 * | 4/2004 | Coveley | A47F 9/048 177/17 |
| 6,990,463 | B2 * | 1/2006 | Walter | A47F 9/046 235/383 |
| 7,672,876 | B2 * | 3/2010 | Bonner | G06Q 30/0601 370/406 |
| 7,953,606 | B2 * | 5/2011 | Shirasaki | 705/1.1 |
| 8,292,169 | B2 * | 10/2012 | Serjeantson | G06Q 10/08 235/375 |
| 8,371,504 | B2 * | 2/2013 | Connelly | 235/383 |

(Continued)

*Primary Examiner* — Asfand Sheikh

(57) ABSTRACT

A weighing scale, digital control panel and a laser scanner are mounted on each "Automated Market Cart", and the operation of purchasing items is based in coordinating a store's main Computer data with the weight of any item by means of the use of a weighing scale, digital control panel and a barcode on each item, scanned by the customer. The "Automated Market Cart" gives the customers the ability to purchase anything with minimal human assistance.

The unique weight and the barcode for each item will be transmitted to the stores main computer. The main store's computer function is that once an item is weighted and the barcode is received from the digital control panel microprocessor, it will check against the database of that unique item and calculate the total price and it will also control all auditing, purchasing, receiving, inventory controls, transferring of products to and from other locations.

1 Claim, 3 Drawing Sheets

(56) References Cited

U.S. PATENT DOCUMENTS

| | | | |
|---|---|---|---|
| 8,418,919 B1* | 4/2013 | Beyda | G07G 1/0054 235/375 |
| 8,746,557 B2* | 6/2014 | Connell, II | A47F 9/047 235/383 |
| 2002/0079367 A1* | 6/2002 | Montani | A47F 9/047 235/383 |
| 2005/0092831 A1* | 5/2005 | Sandoval | G07B 15/04 235/382 |
| 2008/0296392 A1* | 12/2008 | Connell et al. | 235/472.01 |
| 2009/0228363 A1* | 9/2009 | Segev | 705/16 |

\* cited by examiner

AUTOMATED MARKET CART

The "Automated Market Cart" works in a similar way like a regular cashier counter or an automated self-service checkout counter. Both of them operate with a laser scanner operated by an individual. The only difference is that the "Automated Market Cart" will work by itself as a checkout counter with the purchaser's assistance with a laser scanner.

The advantage of having an "Automated Market Cart" is that it will replace the cashier at the counters, facilitating easy flow of people that purchase multiple items in a store, being in a supermarket or a chain/retail store. The "Automated Market Cart" will be easy to handle and operate with an enormous amount of saving in labor cost. A portion of the savings in labor cost will transfer to the manufacturer of the new "Cart" and the utilization of computer technology. The reason for this invention is, so that people will not have the inconvenience of waiting in line and the health problems for cashiers standing many hours a day. This causes a high turn-over rate in these cashier positions, not counting the high revenue loss that may be due to mistakes of cashier actions. It has also been noticed that the self-service checkout counter is not working as expected. At the end, the store has to provide additional number of store employees to guide the purchaser to pay for their items. If people cannot read or operate these self-service checkout counter instructions as they should, the lines increase and shoppers lose their time and patience. Some major grocery chains are getting rid of self-checkout lanes and will replace them with standard checkout counters or express lanes, because they cannot handle large volume of purchases.

The directions on the "Automated Market Cart" will be user friendly and read in most common used languages (e.g. English, Spanish, German). If a person is handicapped, the market/store will provide needed help.

CROSS REFERENCE TO RELATED APPLICATION

Cross-references to other related applications: US Patent Documents:
U.S. Pat. No. 3,836,755 September 1974 Ehrat U.S. Pat. No. 5,083,638 January 1992 Schneider
U.S. Pat. No. 4,676,343 June 1987 Humble U.S. Pat. No. 5,125,465 June 1992 Schneider
U.S. Pat. No. 4,779,706 October 1988 Mergenthaler U.S. Pat. No. 5,168,961 December 1992 Schneider
U.S. Pat. No. 4,787,467 November 1988 Johnson U.S. Pat. No. 7,516,819 April 2009 Johnson

STATEMENT OF FEDERALLY SPONSORED RESEARCH/DEVELOPMENT

There are no rights to this invention that was made under federally sponsored research and development.

REFERENCE TO A SEQUENCE LISTING

Not applicable.

BACKGROUND OF THE INVENTION

This invention is original, and clearly describes how it effectively eliminates unnecessary work. We claim it as a Utility patent which protects the way an invention is used and how it works paraphrasing the applicable US patent classification definition.

"Utility patents may be granted to anyone who invents or discovers any new and useful process, machine, article of manufacturer or composition or matters, or any useful improvement thereof". Therefore, our patent claims a "New and useful Process Improvement".

The invention of the "Automated Market Cart" is a new step forward in making any sale and distribution of agricultural and manufactured products more efficient, convenient and with lots of savings for the consumer and market distributor.

Up until now, anything discovered has not been proven feasible and they have not been commercially developed because of many draw-backs or lack of technology. Research of prior art has not come out with anything resembling how this invention operates.

BRIEF SUMMARY OF THE INVENTION

A weighing scale, digital control panel and a laser scanner are mounted on each "Auto-mated Market Cart", and the operation of purchasing items is based in coordinating a store's main computer data with the weight of any item by means of the use of a weighing scale, digital control panel and a barcode on each item, scanned by the customer.

DETAILED DESCRIPTION OF THE INVENTION

Figure 2:
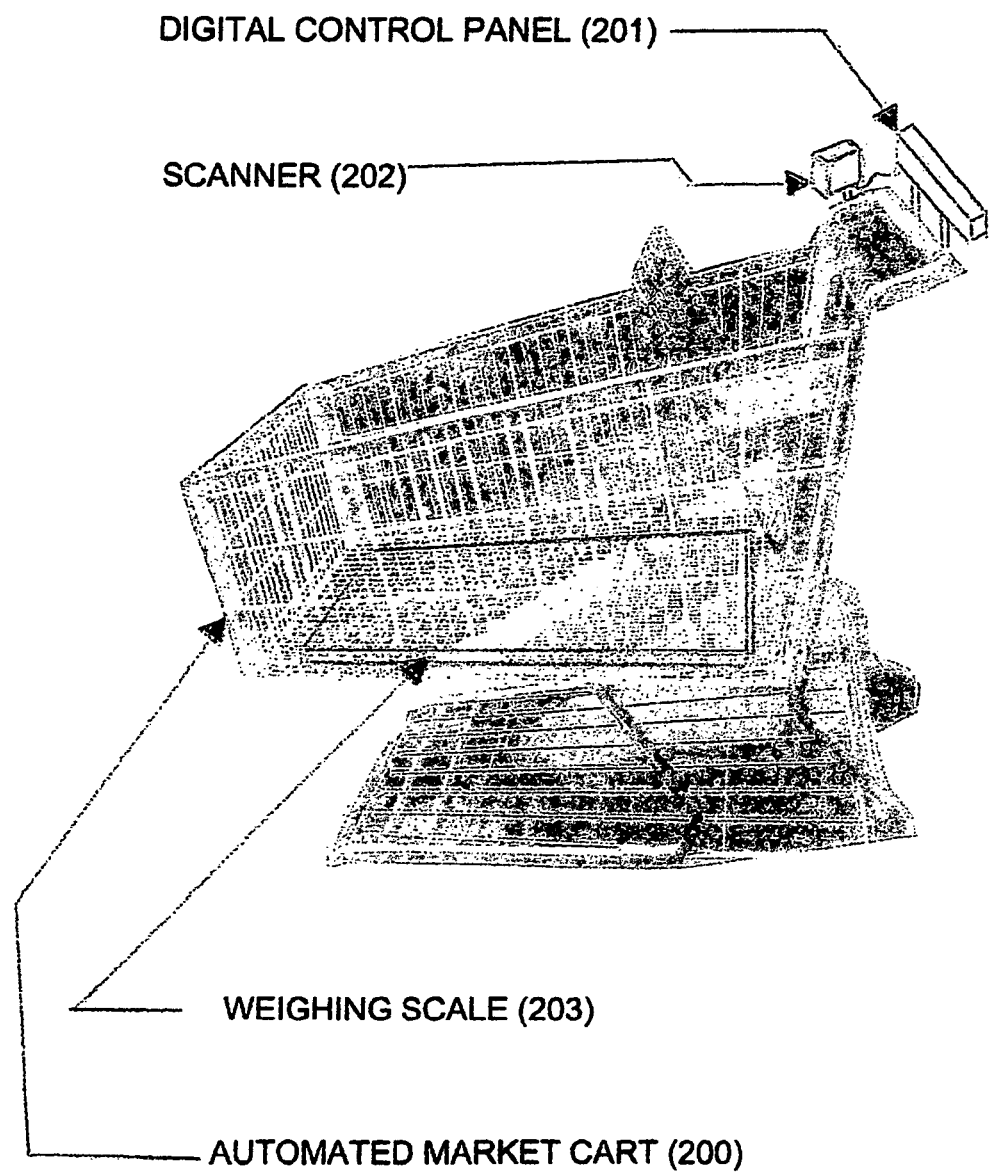
FIG. 2 shows the location of the digital control panel, the weighing scale and the scanner.
Figure 3:
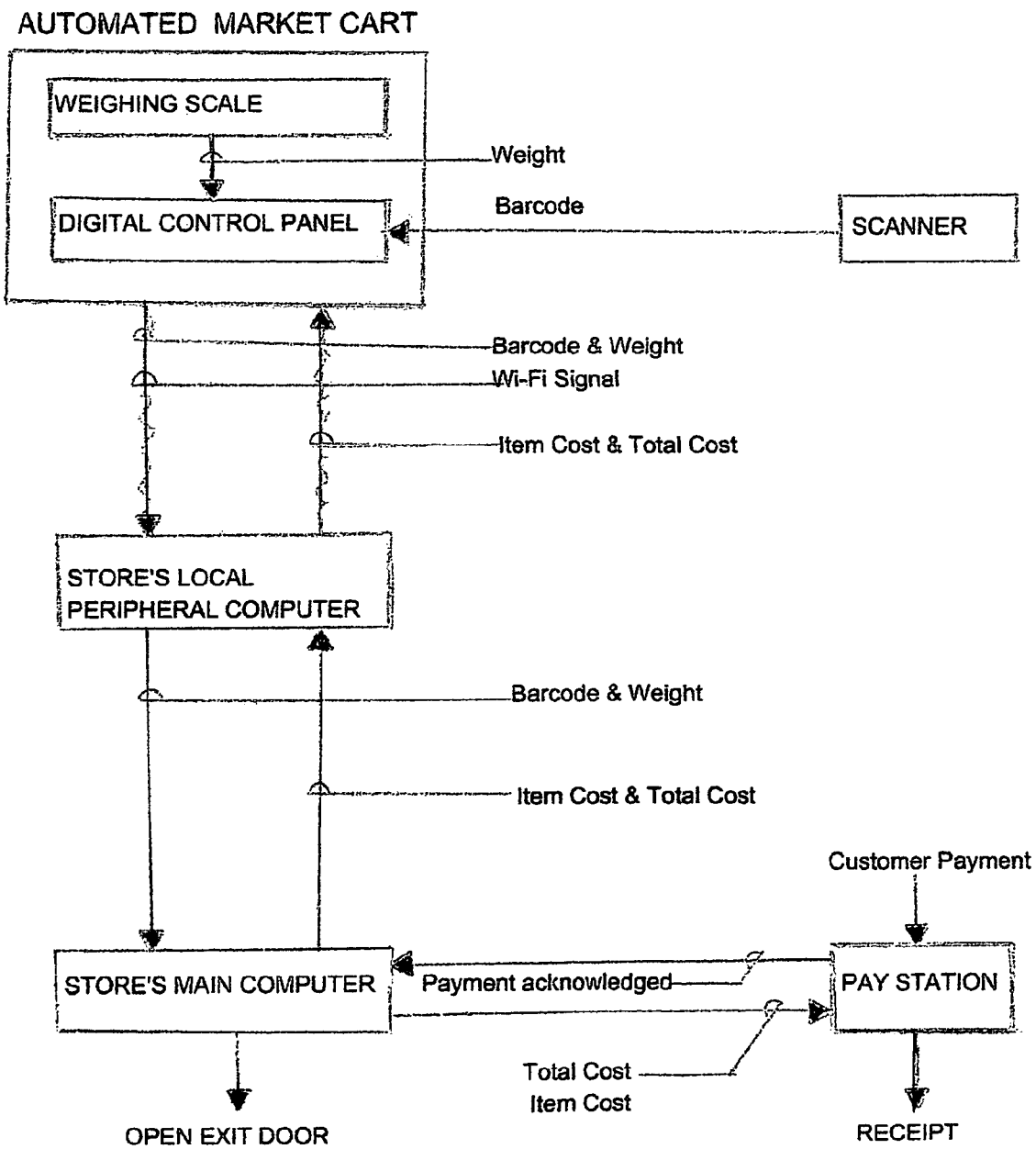
FIG. 3 shows a block diagram illustrating how the process works.

FIG. 2 illustrates a weighing scale 203, digital control panel 201 and a laser scanner 202 are mounted on each "Auto-mated Market Cart" 200, and the operation of purchasing items as illustrated in FIG. 3 is based in coordinating a store's main computer data with the weight of any item by means of the use of a weighing scale, digital control panel and a barcode on each item, scanned by the consumer.

The digital control panel 201 is a microprocessor with a digital screen. Its function is to receive and transmit the information to the store's main computer of each item in respect to its weight, detected by the weighing scale 203, and the barcode detected by the scanner 202. As the items are added one by one onto the weight scale 203, the microprocessor installed on the digital control panel 201 will calculate the new weight of each item.

The unique weight and the information on the bar code for each item will be transmitted via Wi-Fi from the digital control panel's microprocessor 201 to the store's main computer via the store's local peripheral computers. The store's local peripheral computers are hard-wired to the store's main computer.

The store's main computer function is that once the item is weighted and the bar code is received from the digital control panel microprocessor 201, it will check against the database of that unique item and calculate the total price, taken in account taxes, discount coupons and promotions for store products. This information for the total price of the items will be sent to the digital control panel microprocessor and displayed in the digital control panel's screen. This signal will also be sent to the pay station in the store which will accept debit, credit cards, electronic food assistance cards, cash via coin slots, banknote scanners and store gift cards. After payment has been executed cy the customer it will print the receipt and allow the customer to exit with the "Automated Market Cart" 200. The main store computer will also control all purchasing, receiving, inventory controls, transferring of products to and from other locations and keep automatic control of all money transactions.

The "Automated Market Cart", in its physical design, will not be very different from the present market carts as we know them. The difference will be that the "Automated Market Cart" will have a digital control panel with a microprocessor and a digital screen located in its upper rear section facing the customer. A laser scanner is attached to the digital control panel and the basket will be sectionalized in a way to fit 9 brown paper bags in the open position, eliminating the use of plastic bags. The "Cart's" basket will be supported in a way that it will rest freely in an automatic electronic weighing scale.

If an item is placed in the "Automated Market Cart" and is not scanned, an alarm and a red light will appear on the digital control panel and signal the customer to scan that item. If this is not done, the system will not proceed to the purchase of the next item.

All items in the market with all their characteristics have been previously registered in the store's main computer.
The store's main computer will manage all in-store inventories; it will provide information to the responsible store personnel when to restock shelf items from suppliers. A battery will provide the electrical energy to energize the digital control panel.

The digital control panel will only be operational when the "Automated Market Cart" itself is scanned. The store's main computer will always have control of any "Automated Market Cart". Once the customer has finalized the purchases and made payment with a market credit card or other means, the automated digital control panel will shut off. The customer will get a receipt and only then the "Cart" will be allowed to go outside the market. The personnel in the market have to make sure that all "Carts" are returned from the parking lot, the batteries are recharged and ready for use again for each "Cart".

The "Automated Market Cart" will, in its creation and usage, be the future of the markets. These new market installations will have the customer service desk located outside the market. The customer will have the option to pay the purchases with a credit card, food stamp credit card or acquire a market credit card in any denomination from $1.00 to $200.00. The reasons for that, no data can be collected on his personal purchase of merchandise and the information cannot be linked with any other biometric technology to form in-depth personal databases without a person's knowledge or permission.

The customer will access the market through turn-stiles which are used to control access from the outside of the market. If the customer that's inside the market changes his mind and wants to go outside the market, the customer will have to go through a scanner portal exit turn-stile.

Once inside the market the customer will pick-up an "Automated Market Cart" and energize the digital control panel on the "Cart" and, by using the scanner will scan this particular "Automated Market Cart". Each "Automated Market Cart" will have a barcode with a unique identification code.

Figure 1:
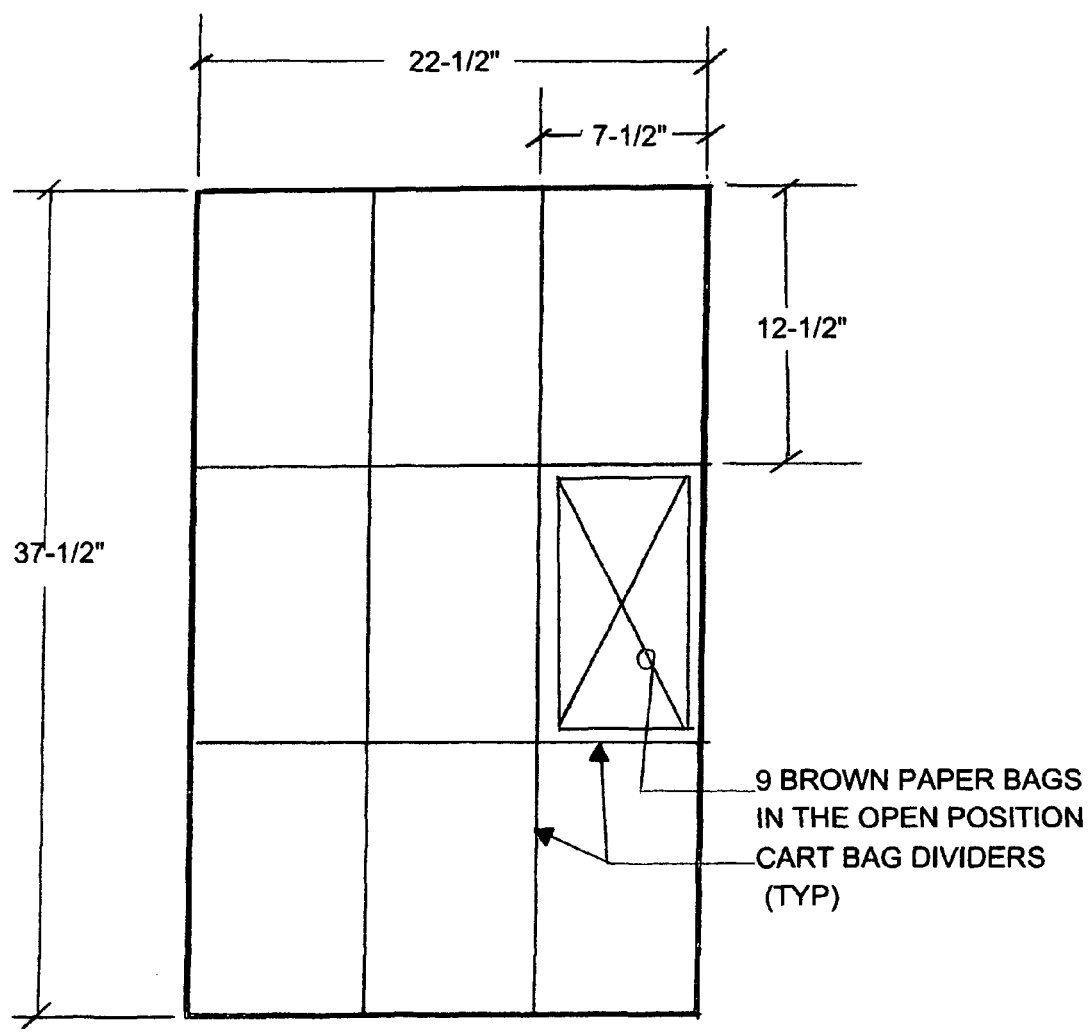
FIG. 1 shows the "Automated Market Cart" in a plan view where the storage area basket has been sub-divided to fit 9 brown paper bags in the open position.

Once the "Cart" is scanned the store's main computer will have control of this particular "Cart". The next step is to pick-up some brown paper bags; the basket in the "Cart" will hold a maximum of 9 bags as illustrated FIG. 1. If the customer starts with 3 or 4 bags and needs more bags they will be available on the isles.

The brown paper bags will be installed inside the "Cart" in the open position and now the customer is ready to proceed to buy any item by scanning each item and placing it inside the "Cart". If the market decides to charge for the brown bags, the customer will have to scan the brown bags in order to pay for them. If, by any reason the customer forgets to scan that item and puts it into the "Cart", a red warning light will come on and advise the customer to scan that item or the system will not proceed forward.

In the meat sections, the customer will have to scan the barcode on each package. in the vegetable and fruit sections, in front of each bin will be a barcode for those particular items in the bin. Once a vegetable- or fruit bin is scanned, the customer will bag the items and put them into the "Cart". Each vegetable- and fruit bin is resting on a weighing scale and the total weight of the bin is recorded in the store's main computer when the bin is full of fruits or vegetables.

No one can scan a fruit or vegetable bin of a lesser value and pick one of more value because the whole weight of each bin is registered in the main frame computer.

A customer who has a coupon for a particular item will have to scan first the item and then the coupon. The system will verify the coupon for its validity for that particular item and give the discount. The coupon will be deposited into a slot on the digital control panel for later verification and storage.

If a customer doesn't want an item, the following needs to be done: The item will have to be Picked up from the "Cart" and get scanned in order to get the credit for the weight and price for this item. Once the purchase is done, the customer will direct the "Cart" through a special aisle and will pay for the total purchase with the market credit card or other means. No customer can change from an "Automated Market Cart" of a lesser value for a greater value "Automated Market Cart" because the store's main computer has been tracking that particular "Cart" that has been scanned and the store's main computer knows ahead of time the total cost for that "Cart". The store's main computer, at the time all parameters are complete will authorize the exit door to be open, the customer will get a receipt, the store's door will automatically open and the digital control panel will automatically shut off and the customer will gain excess to the outside of the market with the "Automated Market Cart".

In retail stores where the items are larger and heavier, the customer will scan the item and once the item is paid for, the customer can pick-up the item in the pick-up section of the store.

As soon as the item is scanned, personnel in the retail stores' item pick-up section will get the signal to prepare the item for pick-up.

With this method of automated purchasing of merchandise it will eliminate any errors made on a regular cashier counter, which causes $1 billion-$2.5 billion of losses per year. It will also save time, because the items will not be reshuffled three times (once when you purchase them, put them into the shopping cart and when you take them out of the "Cart" for payment and repack it when the customer leaves the market). All of these actions cost time and money.

The system requires that the store's local peripheral computers are hard-wired to a store's main computer. The hardware and the software will be written for the smooth transition required for electronic operation to operate this market without the cashier counter personnel or the self check-out counters.

Technology and experience in barcode reading, set-up and transmitting to a store's main computer is available for the achievement of this concept.

The "Automated Market Cart" is designed to be weatherproof for any climate condition. It will also have a tracking device to help monitor and protect the "Automated Market Cart", should anybody take the "Cart" out of the premises of the market. The tracking device will help to recover it.

This new concept of marketing has the customer service counter located outside the perimeter of the main market.

The customer service counter will handle any relations with customers and will also supervise automated dispensers of market credit cards.

This new concept of marketing will eliminate any loss of merchandise due to un-scrupulous people and may also eliminate possible tax evasion.

The system created by the "Automated Market Cart" does not rely on the honesty of the buyer because the system will be designed to eliminate any wrong-doings.

The following main equipment is required for the "Automated Market Cart":
(a) "Automated Market Cart's" main frame
(b) "Automated Market Cart's" basket.
(c) Electronic digital weighing scale.
(d) Digital control panel and scanner.
(e) Battery.
(f) Wi-Fi store's local peripheral computer networks
(g) Store main computer.
(h) Automated Market Credit Card Dispenser.
(i) Barcodes.
(j) Pay stations.

"Automated Market Cart's" main frame: The "Automated Market Cart's" main frame support for the basket, scale, digital control panel, scanner and battery. It will be built with strong metals or a combination of hard plastics but specifically with tubular runs in such a way that cable connections can be pulled trough (e.g. from the weighing scale to the digital control panel).

"Automated Market Cart's" basket: The "Automated Market Cart's" basket will rest On top of the weighing scale and will be sectionalized to hold 9 brown paper bags in the open position.

Electronic digital weighing scale: The electronic digital weighing scale will give instantly the weight of any item that's being put into the brown paper bags and transmits that information to the digital control panel and the store's main computer after the item is scanned.

Digital Control Panel and Scanner: The digital control panel is a microprocessor with digital screen. Its function is to receive and transmit the information to the store's main computer of each item in respect to its weight, detected by the weighing scale and the barcode detected by the scanner. As the items are added, one by one, onto the weight scale, the microprocessor, installed on the digital control panel, will calculate the new weight of each item. The unique weight and the information in the barcode for each item will be transmitted via Wi-Fi from the digital control panel microprocessor to the store's main computer. The store's main computer will sent the cost of the item to the digital control panel microprocessor and displayed in the digital control panel's screen and also to the pay stations.

Battery: There are two types of batteries: Primary and secondary batteries. Secondary (rechargeable batteries) which are designed to be recharged and used multiple times will be the ones to be used in the "Automated Market Cart". Secondary batteries can be recharged. That is, they can have their chemical reactions reversed by supplying electrical energy to the cell, restoring their original composition. Devices that supply the appropriate current to these batteries are called "chargers" or "rechargers".

Rechargeable batteries include several "dry cells" which are sealed units and therefore useful in appliances such as phones and laptop computers.

Recent developments include batteries with imbedded functionality such as USB Cells with a built-in charger and USB connector within the AA-format enabling the battery to be charged by plugging it into a USB port without a charger and low cell discharge.

The battery installed in the "Automated Market Cart" will have to comply with all of the Federal regulations for the use of this type of application.

Wi-Fi store's local peripheral computer networks: These localized Wi-Fi computer networks will pick-up the signal from each scanned item via Wi-Fi. When two or more computers are connected to each other in such a way that they can share data as well as software and even hardware together, then they are said to be a part of a computer network. Computer networking is a combination of fields of telecommunication and computers. There are various examples of networks like LAN or local area network that connects computers in a closed area like computers in a school. Then there is a WAN or wide area network that connects computers at large distances, even countries. You can consider the interne to be the largest WAN network. Then we have MAN or metropolitan area networks that are bigger than LAN but smaller than WAN and connect cities.

We also have the wireless networks. They are the same as other networks except for the fact that the computers are not physically connected to each other, they communicate using frequencies. We are all used to sending and receiving data from our cell phones through infrared or Bluetooth which is a form of a small wireless network. A computer network is a set of two or more computers connected together in order to share information and other resources.

The computers in a network are connected with one another through cables, satellite or telephone lines. Different types of computers in a network are as follows:

Network Components:
Different components of a network are as follows:
- Network software—This may be part of the operating system or it can be the software designed specifically to manage a network.
- Cables—Cables are usually used to connect devices to a network. Some networks Make use of radio or microwaves to provide the link.
- Connectors—Connectors are used to attach network cables to workstations or other devices.
- Network cards—If a personal computer is to be used as a terminal in a network, a device called a network card must be built into it. Network cards have connectors on them for network cables.
- Terminal Computer—Every computer that is part of a computer network is called a terminal or node. The users—using different terminal computers can share in—formation and sent or receive data from terminal to another.
- Server Computers—Server computer in a computer network is used as a central computer. It controls other computers in the network. Server computers are more powerful than terminals.

Computer networks means that we combine many computers with the help of different components and wiring systems within a single room or a big geographical area. In this network of computers, many computers are linked to each other using any network topology for sharing the data between all of these computers. This computer network can be made in home via connecting two systems or more, and can also be made with 100 computers in a big area. The same hardware components which are used for the making of computer networks are Bridges: These are the same hubs and repeaters. The network bridges at the data link layer associate the several network segments. These are mostly used when there is a communication between many networks and less the gateways.

Routers: These are used for the selection of best path for the data sending.

Hubs: This is a hardware device which supplies the association of a network segment via sending the data via network. It performs this function in a simple method, by just copying the data with all the connected computers with the hub.

NIC: The network interface cards are the most necessary thing for a computer network. This network interface card must be installed on each and every computer in the network. With the help of this NIC, a computer becomes able to be part of a network. switches: These are responsible for sending data to its correct destination.

Store main computer: The store's main computer will do the following:
 a) Analysis: Understand the problem, determine what the software is to do, and specify what the user needs to supply (input) to obtain the desired information (output).
 b) Design: Plan a solution, order the steps that solve the problem, refine the design strategy through iteration, decompose a problem into a smaller problem, look for existing software as building blocks for the new software, identify objects.
 c) Implementation: Use computer software and hardware to achieve an executable program that correctly solves the problem or automates the task. Verify that the program does what it is supposed to do and that it does it correctly.

What is desired, for example, in a new market installation is that through the computer software program, items are ordered from the supplier with emphasis that each item ordered has all the characteristics that identify the item and that each item has a unique barcode indicating specifically the packed weight. When the supplier sends those items to the market, at that time it is verified that it is what has been ordered and audits which items go to the shelf or which item goes to the storage; which are sold, how many remain on the shelf and storage. For any vegetable or fruit there is no need for a barcode. The market bin which holds each vegetable- or fruit type will have a unique barcode and the price will be set for each item by weight.

What we really want from the program is that the computer tracks down every item since its order from the supplier goes through receiving, stocking, purchase and payment of the item. The computer will always calculate the margin of profits to what an item should be sold for.

Automated Market Credit Card dispenser: A market credit card in any denomination from $1.00-$200.00 is an option and can be obtained by using a credit card, food stamps or cash or there will be other options for payments. The reason for that, no data can be collected on his personal purchase of merchandise and the information can not be linked with any other biometric technology to form in-depth personal databases without a person's knowledge or permission.

Barcodes: A barcode is an optical machine-readable representation of data which shows data about the object to which it attaches. Originally, barcodes represented data by varying the widths and spacing's of parallel lines and may be referred to as linear or I dimensional (ID). Later they evolved into rectangles, dots hexagons and other geometric patterns in 2 dimensions (2D).

Although 2D systems use a variety of symbols, they are generally referred to as barcodes as well. barcodes originally were scanned by special optical scanners called barcode readers; scanners and interpretive software are available on devices including desktop printers and smartphones. benefits: In point-of sale management barcode systems can provide detailed up-to-date information on the business, accelerating decisions and with more confidence. For example:
 Fast-selling items can be identified quickly and automatically recorded.
 Slow-selling items can be identified, preventing inventory built-up.
 The effects of merchandising changes can be monitored, allowing fast-moving, more
 profitable items to occupy the best spaces.
 Historical data can be used to predict seasonal fluctuations very accurately.
 Items may be re-priced on the shelf to reflect both, sale prices and price increases.
 This technology also enables the profiling of individual consumers, typically through a voluntary registration of discount cards. While pitched as a benefit to the consumer, this practice is considered to be potentially dangerous by privacy advocates.

Besides sales and inventory tracking, barcodes are very useful in logistics.
 When a manufacturer packs a box for shipment, a Unique Identification Number (UIN) can be assigned to the box.
 A data base can link the UID to relevant information about the box; such as order number, items packed, quantity packed, destination, etc.
 The destination can be transmitted through a communication system such as Electronic Data Interchange (EDI), so the retailer has the information about a shipment before it arrives.
 Shipments that are sent to a Distributing Center (DC) are tracked before forwarding. When the shipment reaches its final destination, the UID gets scanned, so the store knows the shipment's source, contents and cost.

Barcode scanners are relatively low cost and extremely accurate compared to key-entry, with only about 1 substitution error in 15,000 to 36 trillion characters entered. The exact error rate depends on the type of barcode.

Pay stations will indicate total costs for the purchases and accept debit cards, credit cards, electronic food assistance cards, cash via coin slots, banknote scanners and store gift cards for payment.

We claim:

1. A automated market cart system for operation of purchasing items in a market, comprising:
 the market including a customer service desk located outside of the market, a plurality of turn-stiles to enter the market, a scanner portal turn-stile to exit the market, an exit door controlled by a main market computer, a pick-up section for large and heavy items, and a plurality of isles containing pay stations;
 a plurality of automated market carts, each of the plurality of automated market carts including: a main frame holding a basket which holds brown paper bags, a digital weight scale disposed under to the basket that allows the basket to rest freely on the digital weight scale, a digital control panel with microprocessor mounted to each of the plurality of automated market carts, a laser scanner attached to the digital control panel to scan items with barcodes, a primary and a secondary battery designed to be recharged and power each of the plurality of automated market carts; a tracking device to prevent their; and a unique automated market cart identification barcode;

the market main computer coupled to peripheral market computers via a local area network, the peripheral market computers communicate to the plurality of automated market carts using local area wireless technology (Wi-Fi);

the market main computer configured to:

activate and control a first automated market cart from the plurality of automated market carts after a first unique automated market cart identification barcode is scanned by a customer;

receive an item weight from a first digital scale of the first automated market cart and receive barcode information from a first laser scanner of the first automated market cart when the customer scans a first item and places the first scanned item into a first basket of the first automated market cart and determine an item is placed in the first basket of the first automated market cart without scanning sounding an alarm and activating red light from a first digital control panel of the first automated market cart;

verify the received item weight with a weight of the first scanned item previously registered in the main market computer or verify the received item weight when the first scanned item rests on a first weight scale in the market, the first weight scale weights a total weight of a plurality of first items on the first weight scale and registers the total weight with the market main computer and the main market computer subtracts the received item weight to the registered total weight verify a coupon when the coupon is scanned by the first laser scanner of the first automated market cart after the first item is placed in the first automated market cart by the customer;

credit a total cost by receiving item weight and barcode information of a second item when the second item is removed from the first digital weight scale of the automated market cart and by scanning with the first laser scanner of the first automated market cart the bar code of the second item;

direct store personnel to pick-up a third item and place it in the pick-up section of the market when the third item is scanned by the first laser scanner of the first automated market cart and when the third item is too large or too heavy to place into the first automated market cart;

transmit to the first digital control panel of the first automated market cart a cost of the first item and an updated total cost of the first automated market cart track a total item count, a total item weight, and the total cost of the first automated market cart;

transmit to a first pay station from the plurality of isles containing pay stations the first automated market cart unique identification the total cost;

receive payment acknowledgement from the first pay station from the plurality of isles containing a pay stations when the customer presents payment and cause the first pay station from the plurality of isles containing pay stations to print a receipt for the first automated market cart;

authorize the exit door of the market to open to allow the customer to exit when the customer presents the receipt for the first automated market cart; and direct the first digital control panel of the first automated market cart to turn off as the customer exits the market.

\* \* \* \* \*